April 28, 1970 S. ORSEN 3,509,367
ULTRALINEAR SWEEP GENERATOR
Filed Dec. 27, 1966
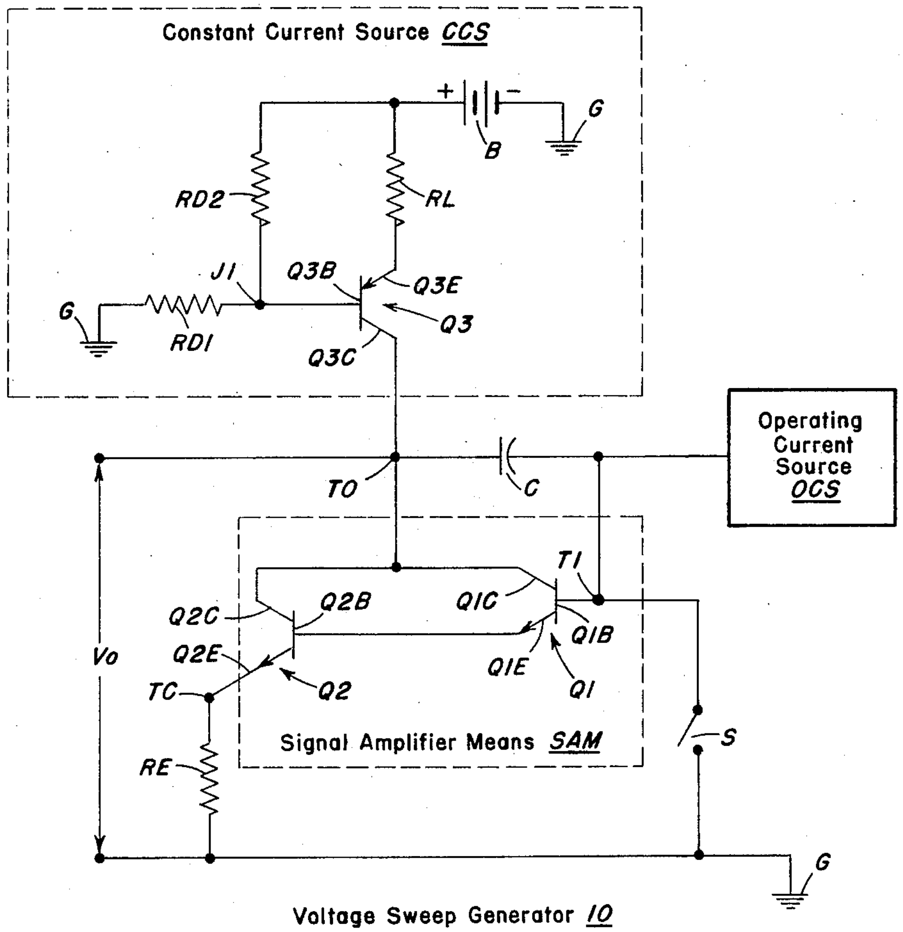
Voltage Sweep Generator 10
INVENTOR
Stefan Orsen
BY Sheldon H Parker
ATTORNEY

United States Patent Office 3,509,367
Patented Apr. 28, 1970

3,509,367

ULTRALINEAR SWEEP GENERATOR

Stefan Orsen, Jersey City, N.J., assignor to American Standard Inc., a corporation of Delaware Filed Dec. 27, 1966, Ser. No. 604,978
Int. Cl. H03k 4/08, 4/50
U.S. Cl. 307—228 8 Claims

ABSTRACT OF THE DISCLOSURE

Covers an ultralinear voltage sweep generator. The generator includes a capacitor which is supplied with cur rent from a source via a regulated transistor network. The capacitor is bridged across the collector-base terminals of a first transistor amplifier, the emitter of which feeds the base of a second transistor amplifier. The output voltage is supplied across the emitter-collector terminals of the second transistor amplifier.

This invention pertains to voltage waveform generators and, more particularly, to voltage sweep generators.

Voltage sweep generators, which are alternately called time base generators, ramp voltage generators, sawtooth waveform generators are noted for the property that, ideally, a voltage increases linearly with time. Such generators have innumerable uses in display devices like radar and television, in converters between analog and digital information, in data communication such as pulse width modulators and demodulators, timing circuits and other electronic measuring devices.

The accuracy of the measurements or the linearity of the display is a function of the linearity of the generated voltage ramp. Most sweep generators utilize the resistance discharge of a capacitor to generate the sweep voltage. Such a discharge follows an exponential function. The exponential function can be expanded in a power series. The first term of the power series is linear. However, succeeding terms are non-linear. While it is possible as a first approximation to obtain a linear relationship by utilizing only a small portion of the start of the discharge time, large dynamic ranges require utilization of more of the discharge time.

In order to minimize the non-linearity of the waveform complicated circuits including compensating feedback paths have been employed. Such circuits are complex and expensive. For a long time it has been known that a family of circuits called Miller sweeps make reasonably good sweep voltage generators as long as several percent of non-linearity can be tolerated. However, they are not satisfactory, without modification, when ultra-linear sweep voltages are desired.

It is a general object of the invention to provide an improved voltage sweep generator.

It is another object of the invention to provide an ultralinear voltage sweep generator.

It is a further object of the invention to provide a voltage sweep generator which has the simplicity of a Miller sweep or ramp voltage generator but generates a voltage which is several magnitudes more linear than the sweep voltage generated by the Miller sweep generator.

Briefly, the invention contemplates a voltage sweep generator which includes a signal amplifier means having an input terminal, an output terminal and a common terminal. A timing capacitor is connected between the input and output terminals of the signal amplifier means. A source of operating potential is connected to the output terminal and a source of electrical energy is connected to the input terminal. In addition, impedance means connect the common terminal of the signal amplifier means to a reference potential. Selectively operable switch means connect the input terminal to the reference potential to control the generation of the sweep voltage at the output terminal.

In accordance with one feature of the invention the signal amplifier means comprises first and second transistors. The collector terminals of the transistors are connected in common to provide the output terminal. The emitter terminal of the first transistor is connected to the base terminal of the second transistor. The base terminal of the first transistor is the input terminal, and the emitter terminal of the second transistor is the common terminal of the signal amplifier means. according to another feature of the invention, the output terminal of the signal amplifier means and, therefore, the timing capacitor is connected to a constant circuit source to further enhance the operation of the generator.

Other objects, features and advantages of the invention will be apparent from the following detailed description of the invention when read in connection with the accompanying drawing whose sole figure shows the now preferred embodiment of the invention.

Before describing the invention, it is instructive to discuss the causes of non-linearity in the Miller sweep or ramp voltage generator crcuit. A mathematical analysis of this circuit indicates that the non-linearity of the ramp voltage is a function of the gain and the input impedance of the amplifier through which the timing capacitor discharges. It has been found that by increasing either one of these parameters decreases the non-linearity.

Referring now to the sole figure, a voltage sweep generator 10 is shown comprising: a signal amplifier means SAM, having an output terminal TO, an input terminal TI and a common terminal TC; a constant current source CCS, including a source of operating potential B, connected to output terminal TO; a reference voltage source G; a selectively operable switch means S, shown schematically as a single-pole single-throw switch, connected between input terminal TI and source of reference potential G; a source of electrical energy in the form of an operating current source OCS connected to input terminal TI; and impedance in the form of resistor RE connecting common terminal TC to source of reference potential G; and timing capacitor C which connects output terminal TO to input terminal TI.

In operation when switch means S is closed timing capacitor C is charged by current flowing from constant current source CCS, via switch means S, to reference potential source G through timing capacitor C. When capacitor C is fully charged the voltage VO at output terminal TO with respect to the reference potential is approximately equal to the magnitude of the operating potential source B. When switch S is opened timing capacitor C starts discharging through the signal amplifying means SAM and the resistor RE to the reference potential source G. The rate of discharge is a function of the voltage present at input terminal TI. This voltage is essentially the feedback voltage from output terminal TO via timing capacitor C. This feedback arrangement tends to linearize the discharge of the capacitor. As was stated previously the linearity is a function of the input impedance of the amplifier, i.e., the impedance seen between input terminal TI and source G. The input impedance is greater than usual by virtue of the resistor RE connected between the common terminal TC and source G. Hence, the voltage sweep generator 10 as so far disclosed is more linear than the equivalent Miller sweep generator.

Now, the signal amplifier means SAM comprises transistors $Q^1$ and $Q^2$ which can be of the n-p-n type. The collector terminals $Q^1C$ and $Q^2C$ of transistor $Q^1$ and $Q^2$ are connected in common to output terminal TO. The emitter terminal $Q^1E$ of transistor $Q^1$ is connected to the base terminal $Q^2B$ of transistor $Q^2$. The base terminal $Q^1B$ of transistor $Q^1$ is connected to the input terminal TI. The emitter terminal $Q^2E$ of transistor $Q^2$ is connected to the common terminal TC. Such a transistor configuration provides an amplifier with extremely high gain and high input impedance. Therefore, since the nonlinearity of the sweep voltage also decreases with increased gain of the amplifier, it is seen that voltage sweep generator 10 generates a still more linear waveform than a conventional Miller sweep or ramp generator.

Now further enhancement of the linearity is obtained by utilizing the constant current source CCS instead of a conventional load resistor connecting the output terminal TO to the operating voltage source B. Constant current source CCS comprises transistor $Q^3$ which can be of the p-n-p type. The collector terminal $Q^3C$ of transistor $Q^3$ is connected to the output terminal TO. A resistor RL connects the emitter terminal $Q^3E$ of transistor $Q^3$ to the positive terminal of source B whose negative terminal is grounded (at reference potential). Operating bias is applied to the base terminal $Q^3B$ through the agency of the resistor network (resistors $RD^1$ and $RD^2$) connected between reference potential source G and the positive terminal of source B, base terminal $Q^3B$ being connected to the junction $J^1$ of resistors $RD^1$ and $RD^2$.

The use of the constant current source CCS provides further improvements. There is now a constant charging current (instead of an exponential charging current) for the timing capacitor C. The capacitor can recharge at a faster rate during the recovery periods. Hence, the repetition rate of voltage sweeps can be raised. Moreover, the effective load of transistors $Q^1$ and $Q^2$ is increased up to the dynamic impedance of transistor $Q^3$ which increases the gain of the amplifier SAM and the $h_{F.E.}$ of the transistors $Q^1$ and $Q^2$ is better stabilized. These two last effects further reduce the non-linearity of the voltage sweep and minimize the effect of variations in the source of operating potential B.

There has thus been shown an improved voltage sweep generator which by virtue of increasing the input impedance and gain of the signal amplifier through which the timing capacitor discharges and by utilizing a constant current source to supply an operating potential for the amplifier generates a voltage sweep which has a linearity improvement of at least three orders of magnitude over conventional Miller sweep or ramp voltage generators.

While only one embodiment of the invention has been shown and described in detail there will now be obvious to those skilled in the art many modifications and variations which satisfy many or all of the objects of the invention, but which do not depart from the spirit thereof as defined by the appended claims.

What is claimed is:

1. An ultralinear voltage sweep generator comprising a high gain signal amplifier means having tandem connected transistors and having an input terminal, an output terminal and a common terminal, a timing capacitor connecting said input terminal to said output terminal, a reference potential, impedance means for connecting said common terminal to said source of reference potential, a source of electrical energy connected to said input terminal, a source of operating potential for charging said capacitor, means comprising a transistor circuit and additional impedance means for connecting said source of operating potential to said output terminal and said capacitor to supply substantially constant current thereto, and selectively operable switch means connecting said input terminal to said reference potential for controlling the generation of the voltage sweep at said output terminal.

2. The ultralinear voltage sweep generator of claim 1 wherein said signal amplifier means comprises first and second transistors, each of said transistors having collector, base and emitter terminals, means connecting the collector terminals of said transistors in common to provide said output terminal, and means for connecting the emitter terminal of said first transistor to the base terminal of said second transistor, the emitter terminal of said second transistor being said common terminal and the base terminal of said first transistor being said input terminal.

3. The ultralinear voltage sweep generator of claim 1 wherein said means for connecting said source of operating potential to said output terminal is a constant-current controlling means.

4. The ultralinear voltage sweep generator of claim 1 wherein said means for connecting said source of operating potential to said output terminal comprises a transistor having collector, base and emitter terminals, means for connecting said collector terminal to the output terminal of said signal amplifier means, a first resistor for connecting said emitter terminal to said source of operating potential, and means for applying an operating current from said source of operating potential to the base terminal of said transistor.

5. The ultralinear voltage sweep generator of claim 3 wherein said signal amplifier means comprises first and second transistors, each of said transistors having collector, base and emitter terminals, means connecting the collector terminals of said transistors in common to provide said output terminal, and means for connecting the emitter terminal of said first transistor to the base terminal of said second transistor, the emitter terminal of said second transistor being said common terminal and the base terminal of said first transistor being said input terminal.

6. The ultralinear voltage sweep generator of claim 5, wherein said impedance means is a resistor.

7. An ultralinear voltage sweep generator comprising: first and second transistors constituting a high gain amplifier, each transistor having base, collector and emitter terminals, means for directly connecting in common the collector terminals of said first and second transistors, means for connecting the emitter terminal of said first transistor to the base terminal of said second transistor; a source of reference potential; a first resistor means connecting the emitter terminal of said second transistor to said source of reference potential; a current source connected to the base terminal of said first transistor; a constant current source to supply substantially constant current to said commonly connected collector terminals, said constant current source comprising a source of operating potential, a third transistor having collector, base and emitter terminals, a second resistor means connecting the emitter terminal of said third transistor to said source of operating potential, means for applying an operating current from said source of operating potential to the base terminal of said third transistor; means for connecting the collector terminal of said third transistor to said commonly connected collector terminals; controllably operable switch means connecting the base terminal of said first transistor to said source of reference potential for controlling the transmission of sweep voltages from said common connected collector terminals; and a capacitor connecting said commonly connected collector terminals to the base terminal of said first transistor and to said switch means so that said capacitor will be charged at a high and substantially constant rate when said switch means is closed and discharged through said high gain amplifier when said switch means is opened.

8. The ultralinear voltage sweep generator of claim 7 wherein said means for applying an operating current to the base terminal of said third transistor comprises a resistance divider network connected between said source of reference potential and said source of operating potential and means for connecting the base terminal of said third transistor to said resistance divider network.

References Cited

UNITED STATES PATENTS

| | | | |
|---|---|---|---|
| 2,594,104 | 4/1952 | Washburn | 328—128 |
| 3,210,558 | 10/1965 | Owen | 307—228 |
| 3,263,093 | 7/1966 | Erdmann | 307—228 |
| 3,315,101 | 4/1967 | Smith | 307—228 |
| 3,395,293 | 7/1968 | Perloff | 307—228 |

DONALD D. FORRER, Primary Examiner

S. D. MILLER, Assistant Examiner

U.S. Cl. X.R.

307—315; 328—128, 183, 184